United States Patent [19]

Achenbach

[11] Patent Number: 4,853,860
[45] Date of Patent: Aug. 1, 1989

[54] CONTROL SYSTEM FOR ADJUSTABLE AUTOMOTIVE SUSPENSION UNIT

[75] Inventor: Kurt F. Achenbach, Milford, Mich.

[73] Assignee: Ford Motor Company, Dearborn, Mich.

[21] Appl. No.: 122,313

[22] Filed: Nov. 18, 1987

[51] Int. Cl.⁴ ............................................. B60G 17/00
[52] U.S. Cl. .............................. 364/424.05; 280/707; 280/840
[58] Field of Search .................. 364/424.05; 280/6 R, 280/6 H, 7.7, 689, DIG. 1

[56] References Cited

U.S. PATENT DOCUMENTS

| | | | |
|---|---|---|---|
| 4,313,529 | 11/1979 | Kato et al. | 280/714 |
| 4,555,126 | 10/1983 | Ishimitsu et al. | 280/707 |
| 4,564,214 | 3/1984 | Tokunaga et al. | 280/707 |
| 4,575,116 | 12/1983 | Miyata | 280/707 |
| 4,621,832 | 11/1986 | Nakashima et al. | 280/707 |
| 4,621,833 | 12/1985 | Soltis | 280/707 |
| 4,652,010 | 3/1987 | Sugasawa | 280/707 |

FOREIGN PATENT DOCUMENTS

| | | |
|---|---|---|
| 0145013 | 11/1984 | European Pat. Off. . |
| 0157576 | 3/1985 | European Pat. Off. . |
| 2362017 | 9/1976 | France . |

Primary Examiner—Gary Chin
Attorney, Agent, or Firm—Jerome R. Drouillard; Roger L. May

[57] ABSTRACT

A control system for an adjustable automotive vehicle suspension unit calculates the instantaneous angular rate of a steering handwheel associated with the vehicle and compares the calculated rate with an initiation value. If the calculated angular rate exceeds the initiation value, the excursion angle of the steering handwheel will be measured during a predetermined time period and in the event that such excursion angle exceeds a critical value during the time period or a threshold value at the conclusion of the time period, the adjustable suspension unit will be adjusted accordingly.

21 Claims, 5 Drawing Sheets

CONTROL SYSTEM FOR ADJUSTABLE AUTOMOTIVE SUSPENSION UNIT

BACKGROUND OF THE INVENTION

1. Field of the Invention

This invention relates to a control system for use with an adjustable automotive suspension unit, and more particularly to a steering input algorithm for use with such a control system.

2. Disclosure Information

Adjustable automotive suspension units and control systems for use therewith have been the subject of much engineering activity and development. U.S. Pat. No. 4,555,126 discloses and claims a system for adjusting the suspension characteristics of at least the front or rear wheels of a vehicle, such that the oversteer or understeer characteristic of the vehicle is altered. This alteration is done when the steering angle exceeds a predetermined value. Such a system suffers from the inability to anticipate changes in a vehicle attitude resulting from the steering angle. In other words, by the time the adjustable system reacts to a change in steering angle, that change in steering angle may have already caused a change in vehicle attitude and as a result, much of the efficiency of the system is lost. Similarly, French Patent Application No. 2,362,017 discloses a steering responsive system in which an off-center movement of the steering rack triggers a control signal to the system controller. This type of system suffers from yet another deficiency inasmuch as if the system is adjusted to produce a control signal with only minimal displacements of the steering handwheel, one result will be that even unintended motion of the steering handwheel will trigger a control system response. If, on the other hand, this system is adjusted such that a more exaggerated movement of the steering handwheel is required to trigger a controlled response, then it is possible that steering handwheel movements which normally and desirably would demand a controlled response will be unmet by such a response. It is an object of the present invention, then, to provide a steering operation algorithm for use with a control system for adjustable automotive suspension units which quickly provides a control signal in the event that the driver is operating the steering handwheel in a manner which yields a useful and intended input into the vehicle steering system.

Automotive designers have created a variety of control systems in which adjustable suspension units are operated according to the instantaneous position of a steering handwheel. Examples of such systems are disclosed in U.S. Pat. Nos. 4,564,214 and 4,621,833, the latter of which is assigned to the assignee of the present invention.

Other suspension control systems using input from a vehicular steering apparatus have utilized steering handwheel angular velocity as an independent control input variable. U.S. Pat. No. 4,575,116 discloses a system in which different reference values are applied to steering handwheel angular velocity depending on whether the steering handwheel velocity is in a direction away from the steering center or a direction toward the steering center.

European Patent Application No. 0,145,013 discloses a roll-suppressive control system for an automotive suspension system with a variable suspension unit in which the damping capability of the suspension unit is increased in the event that steering angular displacement within a given period exceeds a reference value which varies as a function of vehicle speed. This system suffers from a significant drawback inasmuch as it responds only to the average steering rate value calculated during the variable time period and is therefore unable to respond to instantaneously detected steering rates exceeding a critical value.

European Patent Application No. 0,157,576 discloses yet another steering control algorithm for use with an adjustable suspension unit in which the onset of a turn is used to trigger a firmer suspension setting, whereas the detection of the completion of a turn is used to trigger a return to a normal or softer suspension setting. This system utilizes steering handwheel angular rate as an input to the control algorithm. As such, it may be expected to suffer from the previously described defect residing in any system which utilizes solely steering system angular rate as its primary steering input.

As previously noted, it is an object of the present invention to provide a control system for an automotive suspension unit which will respond to intended input from the vehicle driver by placing adjustable suspension units in a firmer setting only when the driver has moved the steering handwheel purposively but not when the driver moves the handwheel in a manner intended to maintain the vehicle on a continuous heading.

It is an advantage of the present invention that a control system according to this invention will be nonresponsive to unwanted or unintentional steering inputs.

It is yet a further advantage of the present invention that a control system according to this invention will provide rapid response to meaningful steering inputs.

Other objects, features and advantages of the present invention will become apparent to the reader.

SUMMARY OF THE DISCLOSURE

In accordance with an embodiment of this invention, a control system for an adjustable automotive suspension unit comprises first means for calculating the instantaneous angular rate of a steering handwheel associated with the automotive vehicle, second means for comparing the calculated angular rate of the handwheel with an initiation value and for generating a first signal whenever the angular rate of the handwheel exceeds initiation value, third means responsive to said first signal for determining, during a predetermined time period after the first signal is generated, the excursion angle through which the steering handwheel is moved, and fourth means for comparing the excursion angle to critical and threshold reference values and for generating a second signal when the excursion angle exceeds either the critical reference value at any time during the predetermined time period or the threshold reference value at the conclusion of the predetermined time period.

A control system according to this invention includes fifth means responsive to said second signal for adjusting the adjustable suspension unit.

The previously mentioned excursion angle is measured from the instantaneous position of the steering handwheel at the time the first signal is generated. The predetermined sample time period as well as the critical and threshold angle values may be varied with the forward velocity of the vehicle. When the measured excursion angle exceeds either of the reference values, the suspension unit will preferably be placed in a firmer setting. In this context, firmer may mean that either the suspension unit's damping rate or spring rate or both are set to a higher level.

In order to account for returns of the steering wheel, the instantaneous angular rate of the steering wheel will be recalculated whenever the steering handwheel is returned to the position which the handwheel occupied at the time the first signal triggering measurement of the excursion angle is generated.

The suspension unit will usually be maintained in an adjusted state for a predetermined adjustment period of time following any particular adjustment. At the conclusion of the predetermined adjustment period, the suspension unit will be returned to its original state unless the excursion angle exceeds a specified reference value at the conclusion of the predetermined time period. The reference value for the excursion angle measured from the initiation position may be selected from a range of values including a critical value according to a pseudo position algorithm.

A control system according to the present invention may further comprise a sixth means for finding an instantaneous steering handwheel excursion angle measured from a dynamically determined steering center position which means also generates a third signal in the event that the instantaneous excursion angle exceeds a predetermined value. If this subsystem is used, the suspension unit will be maintained in an adjusted state at the conclusion of the predetermined adjustment period, either in the event that the third signal is produced by the sixth means or in the event that the excursion angle exceeds a specified reference value at the conclusion of the predetermined adjustment period.

According to the present invention, a method for controlling an adjustable automotive vehicle suspension unit comprises the steps of calculating the instantaneous angular rate of the steering handwheel associated with the vehicle, comparing the calculated angular rate with an initiation value, generating a first signal whenever the angular rate exceeds the initiation value, determining during a predetermined time period after the first signal is generated an excursion angle through which the handwheel is moved, comparing the excursion angle to critical and threshold reference values, generating a second signal when the excursion angle exceeds either the critical reference value at any time during the predetermined time period or the threshold reference value at the conclusion of the predetermined time period, and adjusting the adjustable suspension unit in response to the second signal. An adjustable suspension unit would normally be placed in a firmer setting in response to the second signal. According to this method, the excursion angle is preferably measured from the instantaneous position which the handwheel occupied at the time the first signal was generated. The instantaneous angular rate is recalculated whenever the handwheel is returned to this latter position. The instantaneous angular rate will be recalculated at the beginning of each predetermined time period as well.

DESCRIPTION OF THE PREFERRED EMBODIMENTS

Figure 1:
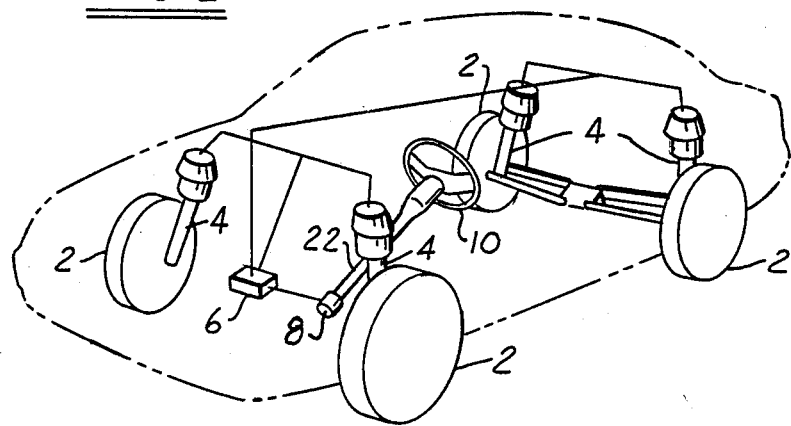
FIG. 1 is a schematic representation of an automotive vehicle including a control system according to the present invention.

As shown in FIG. 1, a control system for an adjustable automotive suspension unit according to the present invention is intended for use with a vehicle having a plurality of road wheels, 2, with at least one of such road wheels having an associated adjustable suspension unit 4, associated therewith. Those skilled in the art will appreciate in view of this disclosure that adjustable suspension units 4 could be employed at either the front or the rear, or at both the front and rear locations of the vehicle. Furthermore, those skilled in the art will appreciate that adjustability in each suspension unit could include the ability to adjust not only shock absorber damping rate but also spring rate, or both. An example of a bistable suspension unit which could be used in the practice of the present invention is disclosed in U.S. Pat. No. 4,313,529, which is hereby incorporated by reference in this document. According to the '529 patent, damping force is rendered adjustable by a rotary valve positioned within a passageway extending through the damper's piston. The rotary valve is connected to a potentiometer which is arranged such that its output matches that of a reference signal when the desired position of the shock absorber has been reached. A further example of a shock absorber or suspension strut suitable for practicing the present invention is disclosed in U.S. Pat. No. 4,621,833, which is assigned to the assignee of the present invention.

Continuing with FIG. 1, a control system according to the present invention further comprises suspension control module 6 and steering sensor 8 which is coupled to steering handwheel 10.

Figure 2:
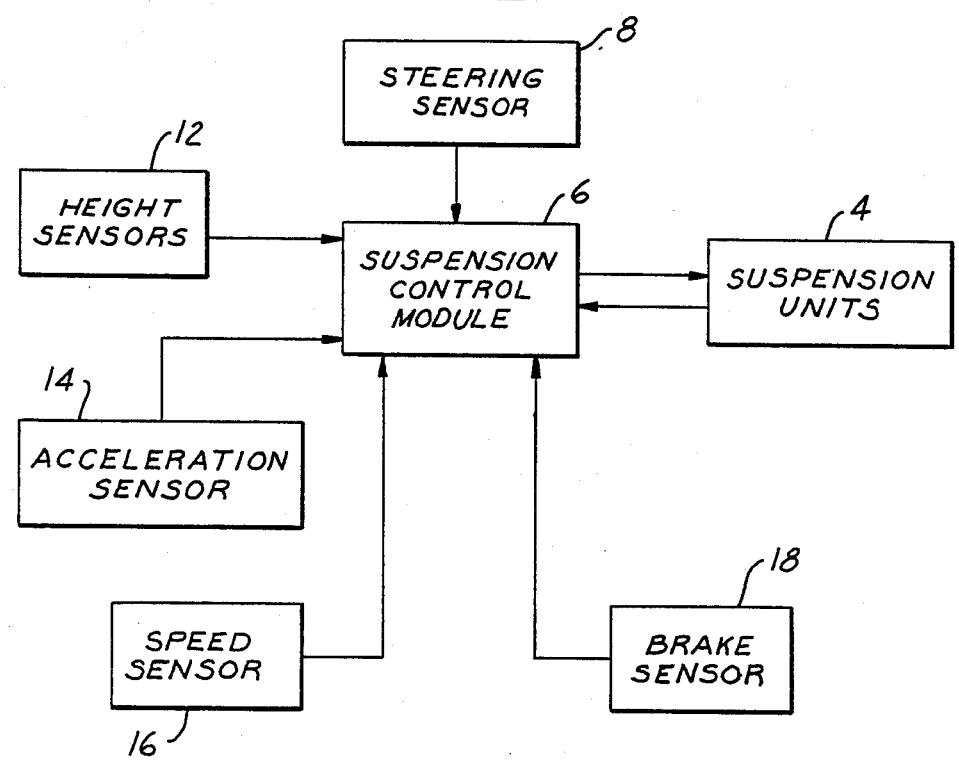
FIG. 2 is an overall system block diagram in accordance with an embodiment of this invention.

FIG. 2 shows all of the sources of information input to suspension control module 6. The control module receives input from steering sensor 8, height sensors 12, acceleration sensor 14, speed sensor 16, brake sensor 18, and suspension units 4. Those skilled in the art will appreciate in view of this disclosure that control module 6 may include a microprocessor and peripheral equipment which could be structured according to several different architectures. In one embodiment, for example, the microprocessor could be configured so that a control program including unit commands is sequentially read from a read-only memory (ROM). Unit commands may be executed by a central processing unit (CPU). The microprocessor may include an input-output control circuit (I/O) for exchanging data with external devices and a readable addressable memory (RAM) for temporarily holding data while the data are being processed. Each of the variables used in the algorithm, such as the critical and threshold values of steering angle, $\theta$ may be stored in look-up tables within the microprocessor memory, or such variables could be calculated on the basis of equations contained within the microprocessor's software. Those skilled in the art will appreciate in view of this disclosure that these and other decisions as to architecture of the microprocessor portion of the control system are merely design considerations.

In the event that suspension units 4 have only two stable operating states, i.e., in the event that the suspension units are bistable, the previously described sensors and suspension control module may be interconnected and programmed such that the adjustable suspension units will be directed into a firm, as opposed to a soft, position whenever firm operation is indicated by any one of the individual sensors. If, for example, the brake sensor determines that the vehicle's service brakes have been applied at a level exceeding a threshold amount, is usually desirable to place the adjustable suspension units in a firm position so as to avoid the known phenomenon "brake dive." Similarly, to avoid pitching of the vehicle, the adjustable suspension units may be placed in the firm position when speed sensor 16 detects that the vehicle has exceeded a given rate of forward velocity. Similar action is indicated in the event that acceleration sensor 14 detects operation of the vehicle's engine in a mode tending to yield vehicle acceleration. Finally, should height sensors 12 detect certain road conditions, such as a rough road surface, it may be desirable to change adjustment of suspension units 4.

As noted above, the purpose of this invention is to provide an optimum level of control of adjustable suspension units as a result of steering handwheel inputs from the vehicle's driver. Although it is desirable to respond as quickly as possible to inputs from the steering handwheel, countervailing considerations are present which affect the speed with which such responses are possible. For example, in the event that the adjustable suspension units and their control system are tuned or set up such that the suspension units are caused to go to a firmer setting with only the slightest movement of the steering handwheel, the system will unnecessarily cause adjustments of the suspension units whenever minute adjustments of the handwheel, having an insufficient magnitude to cause any perceptible change in either the vehicle's course or attitude, are present. If, on the other hand, the adjustable suspension units and control system are configured such that more exaggerated movements of the steering handwheel, in terms of both angular velocity and/or steering angle are required in order to trigger a change in the adjustment state of the suspension units, it is likely that the time response characteristics of the system will be impaired to the point that high frequency steering handwheel inputs will not be met with adequate response. The present invention, however, solves these problems by requiring that changes in the state of the adjustable suspension units based upon steering be made only after certain conditions are met, which conditions assure that only meaningful steering handwheel inputs are responded to, and in the shortest possible period of time.

Figure 3:
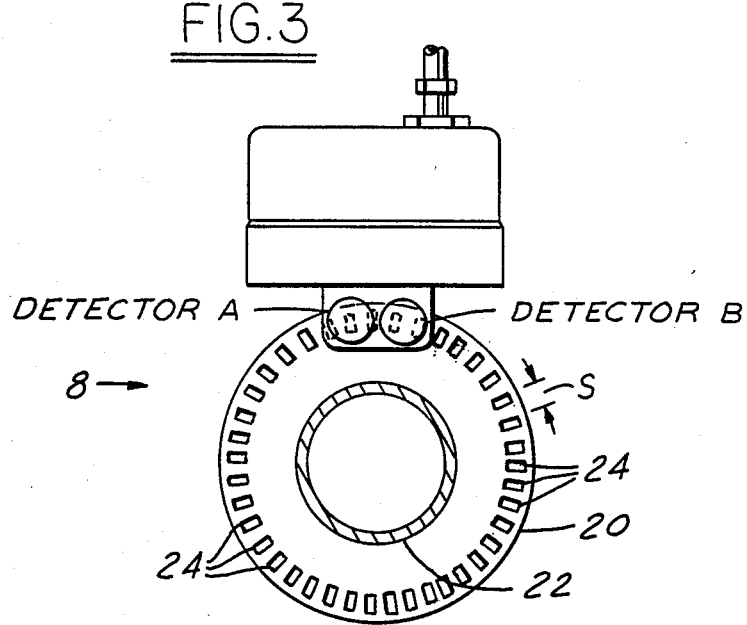
FIG. 3 is a plan view of a steering sensor suitable for use with a system according to the present invention.

As shown in FIG. 3, steering sensor 8 includes shutter wheel 20 which is attached to and rotatable with steering shaft 22. In accord with usual practice, steering shaft 22 runs between steering handwheel 10 and the steering gear which is connected by means of an appropriate linkage to the steerable wheels of the vehicle. Shutter wheel 20 has a plurality of apertures — in this case, 40 in number— which apertures serve to trigger the activity of detectors A and B as shutter wheel 20 is rotated with the steering system of the vehicle. Because there are 40 apertures contained within shutter wheel 20, the steering sensor provides a signal 80 times during one revolution of the steering wheel, and as a result, each of the 80 signals or steps indicates 4.5° of rotation of the steering system. Each of detectors A and B includes a light emitting diode (LED) paired with a photo diode. The photo diode of each diode pair turns on and off according to the presence or absence of light from its paired LED, which impinges upon the photo diode after passing though one of apertures 24. Those skilled in the art will appreciate that the steering sensor could employ any of a variety of detection schemes other than a photo diode pair. For example, magnetic reed switches or Hall Effect switches could be used.

Figure 4:
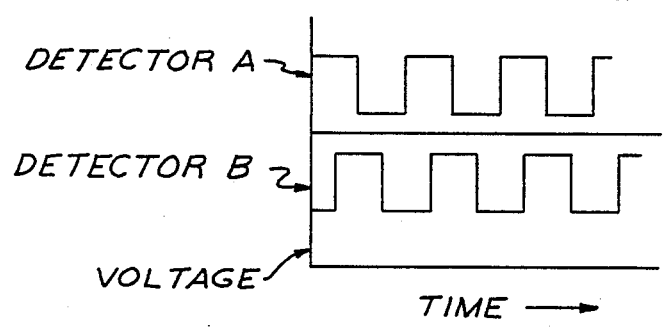
FIG. 4 illustrates the output waveforms of detectors employed in the steering sensor illustrated in FIG. 3.

As shown in FIG. 4, clockwise rotation of shutter wheel 20 produces a waveform pattern for the detectors in which detector A undergoes its transition prior to detector B. In other words, detector A leads detector B. Were the rotation of the shutter wheel to be in the opposite direction, detector B would lead detector A. In this manner, it is possible for the suspension control module to know not only the direction of steering handwheel rotation but also the angle of rotation and the angular velocity of rotation. Each of these factors may be employed in a system according to the present invention.

Figure 5A:
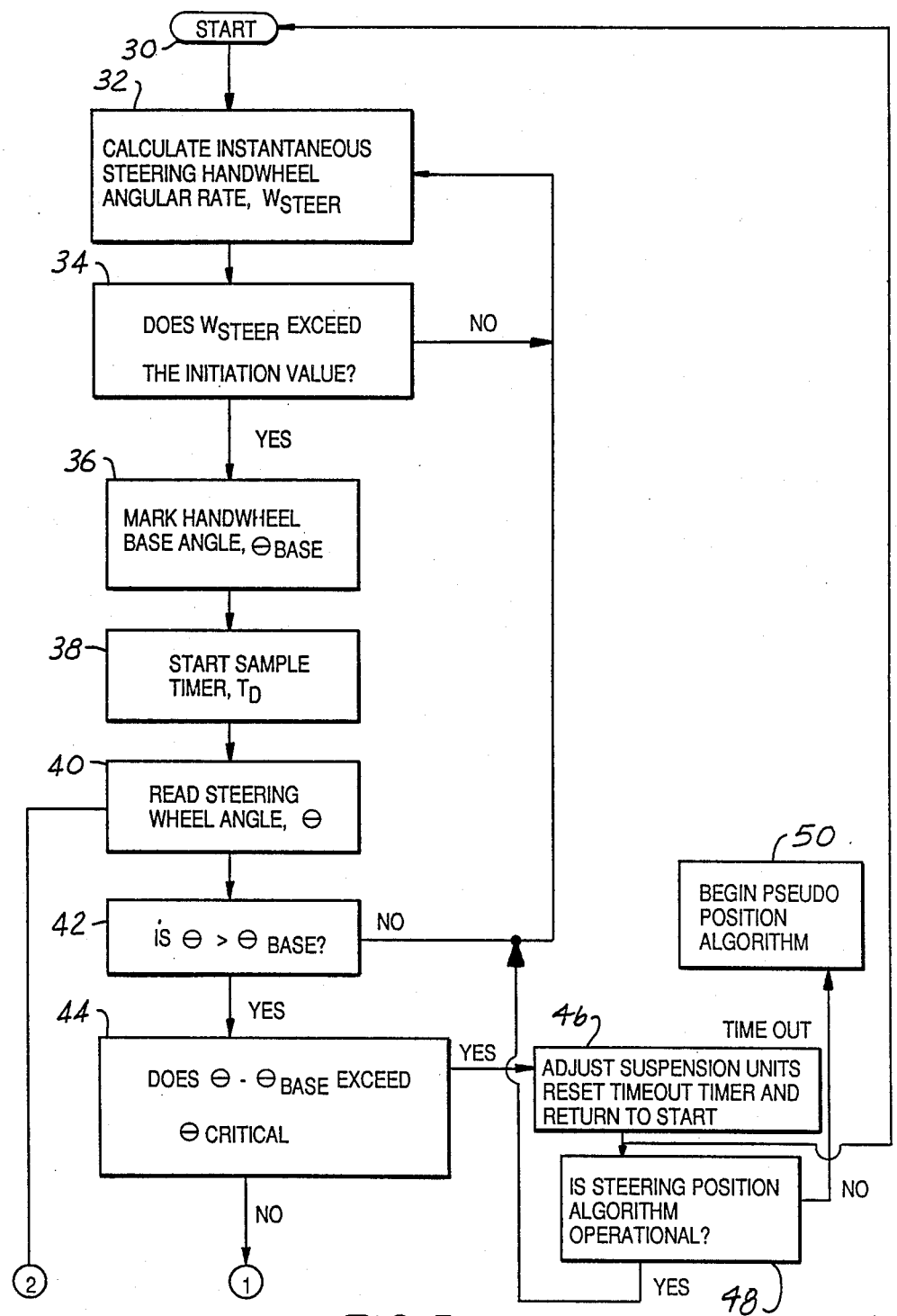
FIGS. 5A and 5B contain a logic flow block diagram in accordance with an embodiment of this invention.
Figure 5B:
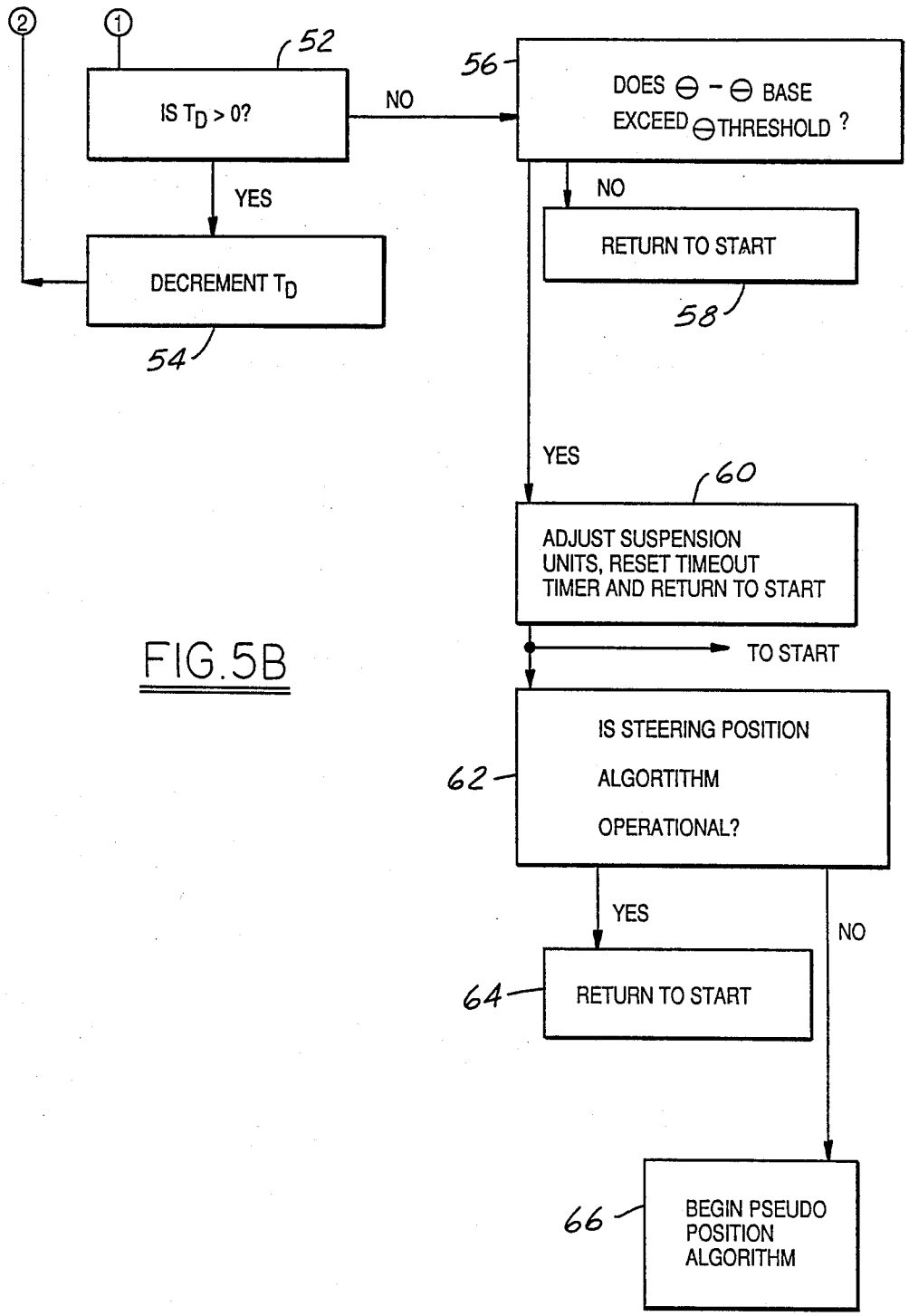

Referring now to FIGS. 5A and 5B, a simplified logic flow diagram for the operation of a control system according to the present invention is shown. In block 32 the computer calculates an instantaneous steering handwheel angular rate $\omega_{STEER}$. The control module calculates this instantaneous steering handwheel angular rate by counting the amount of time required for one of apertures 24 to produce a two-state change in one of detectors A or B. Having calculated instantaneous steering handwheel angular rate, $\omega_{STEER}$, the algorithm passes to block 34, wherein $\omega_{STEER}$ is compared to an initiation value. In the event that $\omega_{STEER}$ does not exceed an initiation value, the program returns to block 32 so that instantaneous steering handwheel angular rate will be calculated again. Accordingly, the control algorithm never progresses beyond a preliminary calculation of instantaneous steering handwheel angular rate until such angular rate exceeds an initiation value. This is important and marks one of the distinguishing factors of the present control system inasmuch as the control system does not devote its resources to more time consuming calculations until such time as the vehicle driver is operating the steering system at a rate which will produce a response in the vehicle chassis of sufficient magnitude such that the adjustable suspension units should be adjusted. If the driver is operating the steering system (steering handwheel) at such a rate, the initiation value will be exceeded and the algorithm will move to the next step, as described below.

In the event that the calculated $\omega_{STEER}$ exceeds the initiation value, a first signal flag will be set and the computer will mark in its memory a handwheel base angle, $\theta_{BASE}$, at block 36. Simultaneously, at block 38 sample timer $T_D$ will be set with the value of a predetermined time period. The algorithm then moves to block 40 to read steering wheel angle $\theta$ which is equal to the excursion angle through which the handwheel is moved during any particular period of operation of sample timer $T_D$. In block 42, $\theta$ is compared to $\theta_{BASE}$. If $\theta$ is not larger than $\theta_{BASE}$ this indicates that a steering reversal has taken place and, as a result, the algorithm will return to block 32 and recalculate the instantaneous steering handwheel angular rate.

A return is made to the beginning of the algorithm in the event of a steering reversal because a reversal indicates that it is highly unlikely that the vehicle's driver intended to make a meaningful steering correction; in the event that the driver moves the wheel off its starting point ($\theta_{BASE}$) and then back through the starting point in the opposite direction within the space of, say, 0.3 seconds, this type of movement is more likely indicative of a nervous driver who tends to "saw" the wheel back and forth excessively than it is an indicator of a driver who is purposively attempting to make a vehicular course change.

In the event that the measured $\theta$ exceeds $\theta_{BASE}$ at block 42, the computer transfers to block 44, wherein the difference between $\theta$ and $\theta_{BASE}$, which difference equals the excursion angle through which the handwheel has been moved, is compared to a critical reference value. In the event that difference between $\theta$ and $\theta_{BASE}$ exceeds a critical reference value, the algorithm will adjust the suspension units at block 46.

Simultaneously with the adjustment at block 46, the computer will return to block 30 and continue to monitor steering rate. At the same time, the computer will reset the timeout timer which keeps track of the amount of time the suspension has been in the adjusted state. If the computer detects the appropriate condition calling for an adjustment during any subsequent time in which the suspension units are in an adjusted state, it will again reset the timeout timer to register zero elapsed time. All this is possible because the computer performs the operations contained in blocks 30-46 in a background loop which cycles at a rate which substantially exceeds the rate at which the suspension units are adjusted and readjusted. For example, the Intel type 8797 microprocessor useful for practicing this invention will cycle through the background loop in no more than 16 milliseconds, whereas the suspension unit will be maintained in an adjusted position for approximately 1.5-2.0 seconds before any further adjustment is performed.

$\theta_{CRITICAL}$, or the critical reference value, will generally depend upon the individual tuning characteristics of the vehicle under consideration. In any event, $\theta_{CRITICAL}$ represents a steering handwheel angle of sufficient magnitude to indicate that an evasive maneuver is likely being attempted by the driver. Such a maneuver could, for example, comprise a sudden lane change necessitated by an obstruction in the roadway. In other words, $\theta_{CRITICAL}$ is selected to be of such a magnitude that there is little doubt that the driver wishes to achieve a rapid and severe change in the vehicle direction, as signified by his severe input into the steering system.

If the excursion angle through which the handwheel has moved during the time period $T_D$ does not exceed $\theta_{CRITICAL}$ at block 44, the computer continues to block 52 wherein the time remaining from the original block of time $T_D$ is compared with a nullity. In the event that time remains on $T_D$, the amount of time remaining on the timer will be decremented by a finite amount at block 54 and the algorithm will return to block 40, read steering wheel angle $\theta$ once again and continue with the remainder of the algorithm. At the conclusion of the period $T_D$, the computer will set a new time period $T_D$ and begin again with the sequence starting with block 30.

If the question found at block 52 is answered in the negative, i.e., in the event that $T_D$ is not greater than zero, this indicates that the predetermined time period established in block 38 has been expended, and inquiry is made at block 56 about the magnitude of the handwheel excursion angle with respect to $\theta_{THRESHOLD}$. $\theta_{THRESHOLD}$ is selected to represent a minimum angle through which the steering handwheel must be turned within time period $T_D$ to warrant adjustment of adjustable suspension units 4. In other words, in the event that the driver does not move the steering handwheel through an angle equal to at least the magnitude of $\theta_{THRESHOLD}$, no adjustment will be made and the computer at block 58 will return to the start block. If, on the other hand, the driver of the vehicle has exceeded $\theta_{THRESHOLD}$ during the time period $T_D$, the computer will adjust the suspension units at block 60. The value of $\theta_{THRESHOLD}$ is selected to correspond to the minimum steering excursion angle for which an adjustment will produce improved vehicle ride and/or handling characteristics.

Upon adjusting the suspension units, the computer begins counting time with the previously mentioned timeout timer and will maintain the suspension units in their adjusted state for a predetermined adjustment period of time. As related previously, the computer will return to block in a background loop and continue to monitor steering rate. The timeout timer will be reset to zero elapsed time whenever steering rate conditions indicate that adjustment is warranted. In this manner the control system is able to maintain the adjustable suspension units in an adjusted condition when the vehicle driver is making appropriate steering inputs, without excessive switching from the adjusted to the unadjusted state and vice-versa.

Figure 6:
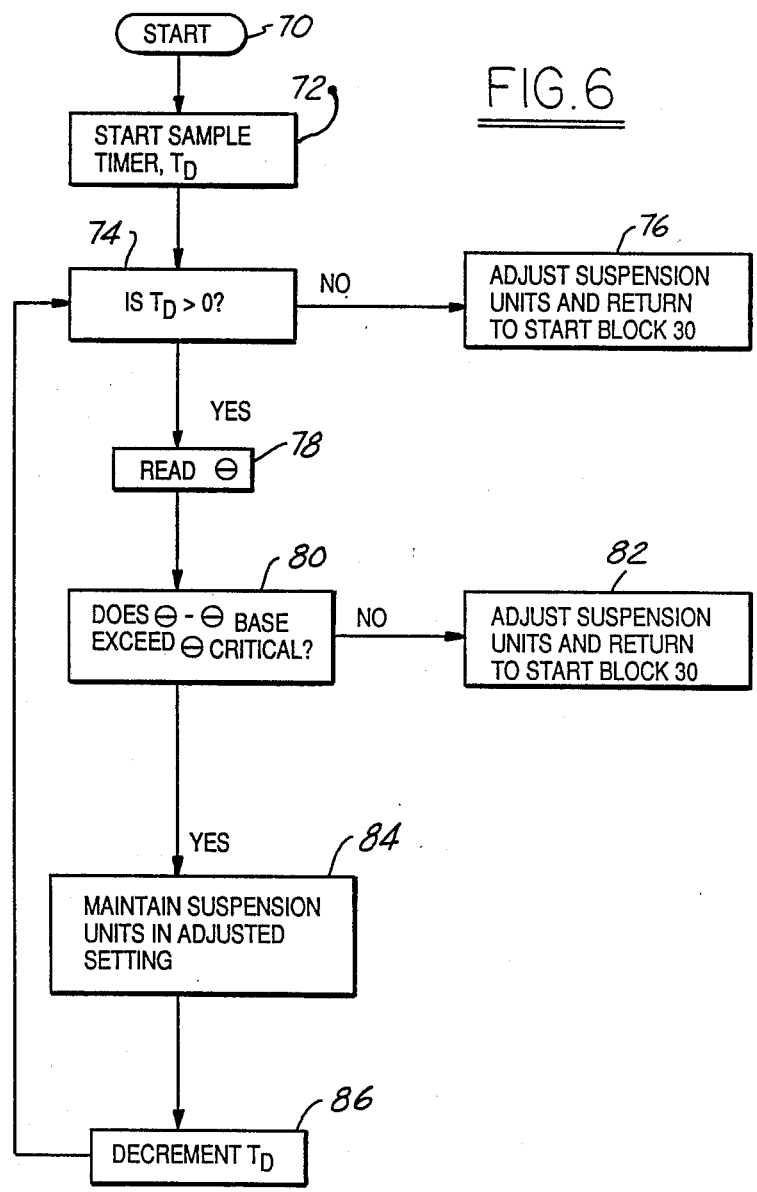
FIG. 6 contains a second logic flow block diagram relating to a portion of a control system according to the present invention.

At the conclusion of the predetermined adjustment period, the suspension units will be returned to their original state unless the excursion angle at the conclusion of the predetermined adjustment period exceeds a retention reference value. The retention reference value is embodied in the pseudo position algorithm shown in FIG. 6. This pseudo position algorithm is reached by the computer from either block 48 or block 62. For the sake of clarity, it should be noted that the operation of the steering position algorithm alluded to in blocks 48 and 62 will be discussed below.

At the beginning of the pseudo position algorithm at block 72 (FIG. 6), sample timer $T_D$ is started again with a finite amount of time registered within the timer. At block 74, the amount of time remaining within sample timer $T_D$ is compared to a nullity. If the amount of time is not greater than zero, the suspension units will be adjusted and the computer will return to the start block of the main algorithm. If, however, time remains on sample timer $T_D$, the computer will read excursion angle $\theta$ at block 78 and compare $\theta$ to $\theta_{BASE}$ at block 80. In the event that the difference between $\theta$ and $\theta_{BASE}$ exceeds $\theta_{CRITICAL}$, the suspension units will be maintained at block 84 in their adjusted setting. The computer will then transfer to block 86 where $T_D$ will be decremented and control transferred to block 74. If the difference between $\theta$ and $\theta_{BASE}$ does not exceed $\theta_{CRITICAL}$, the suspension units will be adjusted in block 82 and the algorithm will pass to start block 30.

Under most conditions, the suspension units will be adjusted at blocks 76 and 82 to a less firm setting because in each case, the situation is identifiable as one in which a less firm setting is desirable.

A control system according to the present invention may preferably further comprise means for finding an instantaneous steering handwheel angle measured from a dynamically determined steering center position. Such instantaneous handwheel position may be compared with a position reference value. If the position reference value is exceeded, this will indicate that the vehicle driver has moved the steering handwheel to a sufficiently great angle that the adjustable suspension units should be placed in another setting. Such a system is disclosed in U.S. Pat. No. 4,621,833, which is assigned to the assignee of the present invention. Accordingly, at blocks 48 and 62, the algorithm asks the question: "Is the steering position algorithm operational?". In the first case, at block 48, if the steering position algorithm is operational, the computer will then transfer to block 32 and begin recalculating instantaneous handwheel angular rate. This will enable the computer to control the suspension units with either of the previously described steering algorithms. In other words, the suspension units may be adjusted based upon either handwheel position, or upon the handwheel's angular velocity as defined by the more complicated velocity algorithm.

If the steering position algorithm is not operational at block 48, the previously described pseudo position algorithm will be entered. When the steering position algorithm is operational, the suspension units will be maintained in an adjusted state at the conclusion of a predetermined adjustment period either in the event that the pseudo position algorithm indicates that the adjusted state is required, or in the event that the steering position algorithm indicates that the instantaneous steering handwheel angle exceeds a predetermined position reference value. Those skilled in the art will appreciate in view of this disclosure that the suspension units could be maintained in an adjusted state at the conclusion of a predetermined time period of adjustment based upon the additional inputs of brake actuation, sensed lateral acceleration, longitudinal acceleration, or other control inputs.

Because the response of a vehicle to a given steering handwheel input, whether the input is measured in terms of steering handwheel angular velocity or merely handwheel angle, depends to a great extent upon the velocity of the vehicle, the predetermined time period for sample timer $T_D$ may be adjusted as a function of the forward velocity of the vehicle. Similarly, the magnitudes of the critical and threshold reference values may be adjusted as a function of the forward velocity of the vehicle. Each of these adjustments may be accomplished by providing lookup tables within the computer's ROM. Similarly, the retention reference value which is included in the determination whether the adjustable suspension units should be maintained in an adjusted state at the end of the predetermined adjustment period may also be selected as a function of vehicle velocity, as may the position reference value utilized as a threshold value for determining the effect of an instantaneous steering handwheel angle.

It is important to note that the foregoing algorithms enable a rapid response to critical steering inputs because in the event that $\theta_{CRITICAL}$ is exceeded during time $T_D$, the adjustable suspension units will be placed in an adjusted state immediately, without the passage of further time. As a result, a system according to the present invention is able to respond very rapidly to severe steering inputs. If, however, the steering input is at a lower rate which is insufficient to meet the initiation value of block 34, the adjustable suspension units will be not put in a firmer setting unless some other control input requires such a setting.

The provision of time $T_D$ for the steering system excursion angle to reach the threshold value recognizes the fact that instantaneous steering angular rate may not, in certain cases, produce a reliable indicator of the need for firmer adjusted suspension setting. The provision of time period $T_D$ and $\theta_{THRESHOLD}$ thus allows the use of an average rate calculation in addition to the instantaneous rate or angle capability enabled by the $\theta_{CRITICAL}$ portion of the algorithm.

Various modifications and variations will no doubt occur to those skilled in the various arts to which this invention pertains. For example, the particular sensors used in conjunction with the disclosed system may be varied from those disclosed therein. Further, the suspension units may comprise active or passive hydraulic, pneumatic, or electrical units, in addition to those described herein. Finally, the various parameters employed within the control algorithms may be selected according to the needs of the individual system and the results required of the system. These and all other variations which basically rely on the teachings through which this disclosure has advanced the art are properly considered within the scope of this invention as defined by the appended claims.

I claim:

1. A control system for an adjustable automotive vehicle suspension unit comprising:

first means for calculating the instantaneous angular rate of a steering handwheel associated with said automotive vehicle;

second means for comparing said calculated angular rate with an initiation value and for generating a first signal whenever said angular rate exceeds said initiation value;

third means responsive to said first signal for determining, during a predetermined time period after said first signal is generated, the excursion angle through which said handwheel is moved;

fourth means for comparing said excursion angle to critical and threshold reference values and for generating a second signal when said excursion angle exceeds either said critical reference value at any time during said predetermined time period or said threshold reference value at the conclusion of said predetermined time period; and fifth means responsive to said second signal for adjusting said adjustable suspension unit.

2. A control system for an adjustable automotive vehicle suspension unit according to claim 1 wherein said excursion angle is measured from the instantaneous position of said handwheel at the time said first signal is generated.

3. A control system for an adjustable automotive vehicle suspension unit according to claim 2 wherein said instantaneous angular rate is recalculated by said first means whenever said handwheel is returned to the position which said handwheel occupied at the time said first signal was generated, whereby said third means will be caused to re-determine said excursion angle.

4. A control system for an adjustable automotive vehicle suspension unit according to claim 1 wherein said predetermined time period employed by said third means is adjusted as a function of as forward velocity of said vehicle.

5. A control system for an adjustable automotive vehicle suspension unit according to claim 1 wherein said critical and threshold values are dependent upon as forward velocity of said vehicle.

6. A control system for an adjustable automotive vehicle suspension unit according to claim 1 wherein said fifth means is directed to place said suspension unit in a firmer setting whenever said excursion angle exceeds either of said reference values.

7. A control system for an adjustable automotive vehicle suspension unit according to claim 1 wherein said instantaneous angular rate is recalculated by said first means whenever said calculated rate does not exceed said initiation value.

8. A control system for an adjustable automotive vehicle suspension unit according to claim 1 wherein said fifth means will maintain said suspension unit in an adjusted state for a predetermined adjustment period of time following any particular adjustment, and at the conclusion of said predetermined adjustment period return said suspension unit to its original state unless said excursion angle exceeds a retention reference value at the conclusion of said predetermined adjustment period.

9. A control system for an adjustable automotive vehicle suspension unit according to claim 8 wherein said retention reference value employed by said fourth means is equal to said critical reference value.

10. A control system for an adjustable automotive vehicle suspension unit according to claim 8 further comprising sixth means for finding an instantaneous steering handwheel angle measured from a dynamically determined steering center position and for generating a third signal in the event that said instantaneous steering angle exceeds a predetermined position reference value, with said sixth means further comprising means for transmitting said third signal to said fifth means so that said suspension unit will be maintained in said adjusted state at the conclusion of said predetermined adjustment period either in the event that said third signal is present or in the event that said excursion angle exceeds said retention reference value.

11. A control system for an adjustable automotive vehicle suspension unit according to claim 8 wherein said predetermined adjustment period of time will be restarted whenever said excursion angle exceeds said critical reference value or said threshold reference value.

12. A method for controlling an adjustable automotive vehicle suspension unit, comprising the steps of:
calculating the instantaneous angular rate of a steering handwheel associated with said automotive vehicle;
comparing said calculated angular rate with an initiation value;
generating a first signal whenever said angular rate exceeds said initiation value;
determining, during a predetermined time period after said first signal is generated, the excursion angle through which said handwheel is moved;
comparing said excursion angle to critical and threshold reference values;
generating a second signal when said excursion angle exceeds either said critical reference value at any time during said predetermined time period or said threshold reference value at the conclusion of said predetermined time period; and
adjusting said adjustable suspension unit in response to said second signal.

13. A method according to claim 12 wherein said adjustable suspension unit will be placed in a firmer setting in response to said second signal.

14. A method according to claim 12 wherein said excursion angle is measured from the instantaneous position said handwheel occupied at the time said first signal was generated.

15. A method according to claim 12 wherein said predetermined time period is adjusted as a function of a forward velocity of said vehicle.

16. A method according to claim 12 wherein said critical and threshold values are dependent upon a forward velocity of said vehicle.

17. A method according to claim 12 wherein said instantaneous angular rate is recalculated whenever said handwheel is returned to the position which said handwheel occupied at the time said first signal was generated.

18. A method according to claim 12 wherein said instantaneous angular rate is recalculated whenever said calculated rate does not exceed said initiation value.

19. A method for controlling an adjustable automotive vehicle suspension unit, comprising the steps of:
calculating the instantaneous angular rate of a steering handwheel associated with said automotive vehicle;
comparing said calculated angular rate with an initiation value;
generating a first signal whenever said angular rate exceeds said initiation value;
determining, during a predetermined time period after said first signal is generated, the excursion angle through which said handwheel is moved;
comparing said excursion angle to a plurality of reference values;
generating a second signal when said excursion angle exceeds one of said reference values;
adjusting said adjustable suspension unit in response to said second signal; and
maintaining said suspension unit in an adjusted state for a predetermined adjustment period of time following any particular adjustment, and at the conclusion of said predetermined adjustment period returning said suspension unit to its original state unless said excursion angle exceeds a retention reference value at the conclusion of said predetermined adjustment period or unless an instantaneous handwheel steering angle measured from a dynamically determined steering center position exceeds a position reference value.

20. A method according to claim 19 wherein at least one of said reference values is a function of a forward velocity of said vehicle.

21. A method according to claim 19 wherein said predetermined adjustment period is restarted whenever said second signal is generated.

* * * * *